(12) United States Patent
Konno

(10) Patent No.: US 6,975,521 B1
(45) Date of Patent: Dec. 13, 2005

(54) SWITCHING POWER SUPPLY APPARATUS

(75) Inventor: Akira Konno, Miyagi (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 10/380,729

(22) PCT Filed: Jul. 18, 2002

(86) PCT No.: PCT/JP02/07308

§ 371 (c)(1),
(2), (4) Date: Mar. 17, 2003

(87) PCT Pub. No.: WO03/009456

PCT Pub. Date: Jan. 30, 2003

(30) Foreign Application Priority Data

Jul. 18, 2001 (JP) .............................. 2001-218445

(51) Int. Cl.[7] .......................................... H02M 3/335
(52) U.S. Cl. .................. 363/21.08; 363/49; 363/56.11
(58) Field of Search .......................... 363/21.01, 21.07, 363/21.08, 21.15, 21.16, 49, 79, 50, 56.01, 363/56.11, 21.18

(56) References Cited

U.S. PATENT DOCUMENTS 5,285,367 A * 2/1994 Keller .................... 363/21.09

6,735,095 B2 * 5/2004 Fahlenkamp et al. ..... 363/21.15

FOREIGN PATENT DOCUMENTS

| JP | 2000-316276 | 11/2000 |
| JP | 2001-45752 | 2/2001 |

* cited by examiner

Primary Examiner—Jessica Han
(74) Attorney, Agent, or Firm—Sonnenschein, Nath & Rosenthal LLP

(57) ABSTRACT

The present invention is directed to a switching power supply apparatus (100) adapted for controlling switching operation of a switching FET (125) which carries out switching of rectified and smoothed output of a primary side rectifying/smoothing circuit (115) by a switching control circuit (130) including a hysteresis low voltage malfunction preventing circuit, wherein lowering time until rated voltage at which constant voltage by self-discharge can be maintained is caused to be longer than time until operating voltage of the low voltage malfunction preventing circuit of the switching control circuit of the primary side at the time of no load, and lowering time until rated voltage at which constant voltage by self-discharge can be maintained is caused to be shorter than time until operating voltage of the voltage malfunction preventing circuit at the time of ordinary load to thereby suppress power consumption as minimum as possible to realize energy-saving at the time of standby.

9 Claims, 4 Drawing Sheets

SWITCHING POWER SUPPLY APPARATUS

BACKGROUND OF THE INVENTION

The present invention relates to a switching power supply apparatus adapted for controlling switching operation of a switching element which carries out switching of rectified and smoothed output of a primary side rectifying/smoothing circuit by a switching control circuit including a hysteresis low voltage malfunction preventing circuit.

Hitherto, there have been widely used switching power supply apparatuses adapted for carrying out switching of direct current obtained by rectifying and smoothing commercial AC (Alternating Current) by, e.g., high frequency of about 100 kHz to efficiently convert it into a desired voltage by transformer.

As a system for controlling output voltage in such switching power supply apparatus, there are employed Pulse Width Modulation (PWM) control system which controls duty ratio of switching pulses in accordance with change of output voltage, and frequency control system or phase control system which controls frequency or phase of switching pulse, etc.

FIG. 1 is an example of circuit configuration of a conventional switching power supply apparatus employing the PWM control system.

This switching power supply apparatus 200 comprises a primary side rectifying/smoothing circuit 215 for rectifying/smoothing AC input delivered through an AC filter 210 from commercial power supply AC, wherein drain of a switching FET 225 is connected to this primary side rectifying/smoothing circuit 215 through a primary winding 220A of a converter transformer 220, and a power supply terminal 230A of a switching control circuit 230 which carries out PWM control of switching operation of the switching FET 225 is connected to the primary side rectifying/smoothing circuit 215 through a starting circuit 240. The power supply terminal 230A is grounded through a capacitor 235.

The switching control circuit 230 includes hysteresis low voltage malfanction preventing circuit therewithin for the purpose of preventing malfunction at the time when power supply voltage is lowered, and is operative so that when power supply voltage Vcc given to the power supply terminal 230A rises from 0V, the operation starts at Vcc=16.5V, and output is cut off (interrupted) at Vcc=9.0V at the time of power supply voltage drop.

A secondary side rectifying/smoothing circuit 250 is connected to a secondary winding 220B of the converter transformer 220 to rectify and smooth converter output obtained at the secondary winding 220B of the converter transformer 220 by the secondary side rectifying/smoothing circuit 250 to output it through an output filter 255. An output detecting circuit 270 is connected to the secondary side rectifying/smoothing circuit 250 through a resistor dividing circuit 260 for output voltage detection and a resistor 265 for output current detection, and detection output by this output detecting circuit 270 is fed back to the switching control circuit 230 through a photo-coupler 280. The output detecting circuit 270 and the photo-coupler 280 become operative with rectified and smoothed output by a rectifying/smoothing circuit 290 connected to the secondary winding 220B of the converter transformer 220 being as drive power supply.

The switching control circuit 230 is started when starting current is delivered through the starting circuit 240 from the primary side rectifying/smoothing circuit 215 at the time of starting to start supply of switching pluses to the switching FET 225, and is operative, after starting, with rectified and smoothed output by a rectifying/smoothing circuit 238 connected to a tertiary winding 220C of the converter transformer 220 being as drive power supply so that duty ratio of switching pulses is changed in accordance with detection output by the output detecting circuit 270 fed back through the photo-coupler 280 to thereby carry out PWM control of switching operation of the switching FET 225 to stabilize converter output.

Meanwhile, in the conventional switching power supply apparatus 200, at the ordinary constant current drooping operation (constant current charging operation of battery), in the case where power of the output detecting control circuit 270 is also taken from the output line, its voltage change width is very wide and a different power supply which can supply stable voltage is required in order to stabilize control. To realize this, devices such as inserting of series regulator, loosening of coupling by different winding of the same transformer to utilize power supply difficult to experience influence of load, or separately providing of rectifying/smoothing circuit even by the same winding, etc. are made to narrow voltage change width even a little to thereby carry out stable control.

Moreover, in the power supply system where power of the output detecting circuit 270 is supplied by different rectification from the same winding of the same transfomer in order to control output of low power switching power supply which carries out intermittent operation in the standby state so that constant voltage and constant current are provided, power necessary for that control is provided by smoothing capacity of the rectifying/smoothing circuit 290 at the time of stop of switching during intermittent operation period. For this reason, capacity of a smoothing capacitor 291 of the rectifying/smoothing circuit 290 becomes large. In addition, since large capacity is required, electrolytic capacitor having good volume capacity ratio is used. For this reason, there also was the problem that change in capacity by change with the passage of time is affected.

In the conventional standby state power saving type switching power supply apparatus, there was employed an approach to detect that there results no-load state to stop switching operation to thereby carry out intermittent operation to carry out power-saving.

As a method of detecting load, there is known a method of inserting resistor in serries with load to detect voltage drop produced across the both ends thereof. In order to detect very small current in the state of light load (about 10 mA) by this method, unless value of detection resistor is set to several ten $\Omega$—several hundred $\Omega$, detection cannot be made with good accuracy. Further, in the case of heavy load, voltage drop and/or exothermic phenomenon at that detection resistor become problem. In the prior art, such problems were solved by a method of shorting detection resistor by semiconductor element. However, the circuit becomes complicated so that there results increase in cost.

In the case where load state is detected to judge that current load state is ordinary load state, light emitting diode of photo-coupler is caused to be turned ON to transmit that signal to switching control circuit of the primary side. Moreover, in the case where it is judged that current load state is no load state, light emitting diode of photo-coupler is caused to be turned OFF to stop switching. In order to carry out such control, it is necessary to carry out transmission by using photo-coupler different from photo-coupler for feedback for constant voltage control. As a result, the circuit additionally becomes necessary.

Further, drive voltage of photo-coupler for judgment of load state becomes short at the time of starting so that its operating state passes through the state where output is not provided. Since such state is judged as no load state, circuit for avoiding it had to be added.

In addition, the photo-coupler is in ON state at all times during ordinary operating state. As a result, extra power is consumed so that there does not result power-saving state at the time of operation.

SUMMARY OF THE INVENTION

The present invention has been proposed in view of conventional problems as described above, and its object is to provide a switching power supply apparatus adapted for only adjusting values of respective key devices without giving great change to the existing circuit to intermittently carry out switching operation at the time of standby state to suppress power consumption as minimum as possible to realize energy-saving at the time of standby state, and to have ability to carry out ordinary operation such as constant voltage, constant current and various protective functional operations in the state where circuit for carrying out its intermittent operation is not affected.

The present invention is directed to a switching power supply appartus adapted to deliver a starting current from a starting circuit of the primary side to start a switching control circuit including a hysteresis low voltage malfunction preventing circuit to control switching operation of a switching element which carries out switching of a rectified and smoothed output of a primary side rectifying/smoothing circuit delivered to the primary side of a converter transformer to rectify and smooth an output from a tertiary winding of the converter transformer by a rectifying/smoothing circuit after starting to drive the switching control circuit by the rectified and smoothed output to rectify and smooth a converter output obtained at a secondary winding of the converter transformer by a secondary side rectifying/smoothing circuit to output it to feed an error signal from an output detecting circuit of the secondary side back to the switching control circuit through a photo-coupler to control switching operation of the switching element by the switching control circuit, wherein drive power is delivered to the photo-coupler by an output by a rectifying/smoothing circuit for driving photo-coupler which rectifies and smooths converter output obtained at the secondary winding of the converter transformer, and drive power is delivered to the output detecting circuit by an output by a rectifying/smoothing circuit for driving the output detecting circuit which rectifies and smooths converter output obtained at the secondary winding of the converter transformer.

In the switching power supply apparatus according to the present invention, e.g., time T1 from low voltage protection voltage to release voltage of the low voltage malfunction preventing circuit of the switching control circuit, drivable time T2 of light emitting diode of the photo-coupler by the rectifying/smoothing circuit for driving photo-coupler, and secondary control operable time T3 of the output detecting circuit driven by the rectifying/smoothing circuit for driving the output detecting circuit are assumed to be as follows.

T1>T2>T3

Further, in the switching power supply apparatus according to the present invention, power is delivered to the output detecting circuit through an additional circuit from the secondary side rectifying/smoothing circuit at the time of intermittent operation during standby state, thereby making it possible to stabilize control operation.

Still further objects of the present invention and practical merits obtained by the present invention will become more apparent from the description of the embodiments which will be given below with reference to the attached drawings.

DETAILED DESCRIPTION OF THE PRESENTLY PREFERRED EMBODIMENTS

Explanation will now be given in detail with reference to the attached drawings in connection with the embodiment of the present invention.

Figure 1:
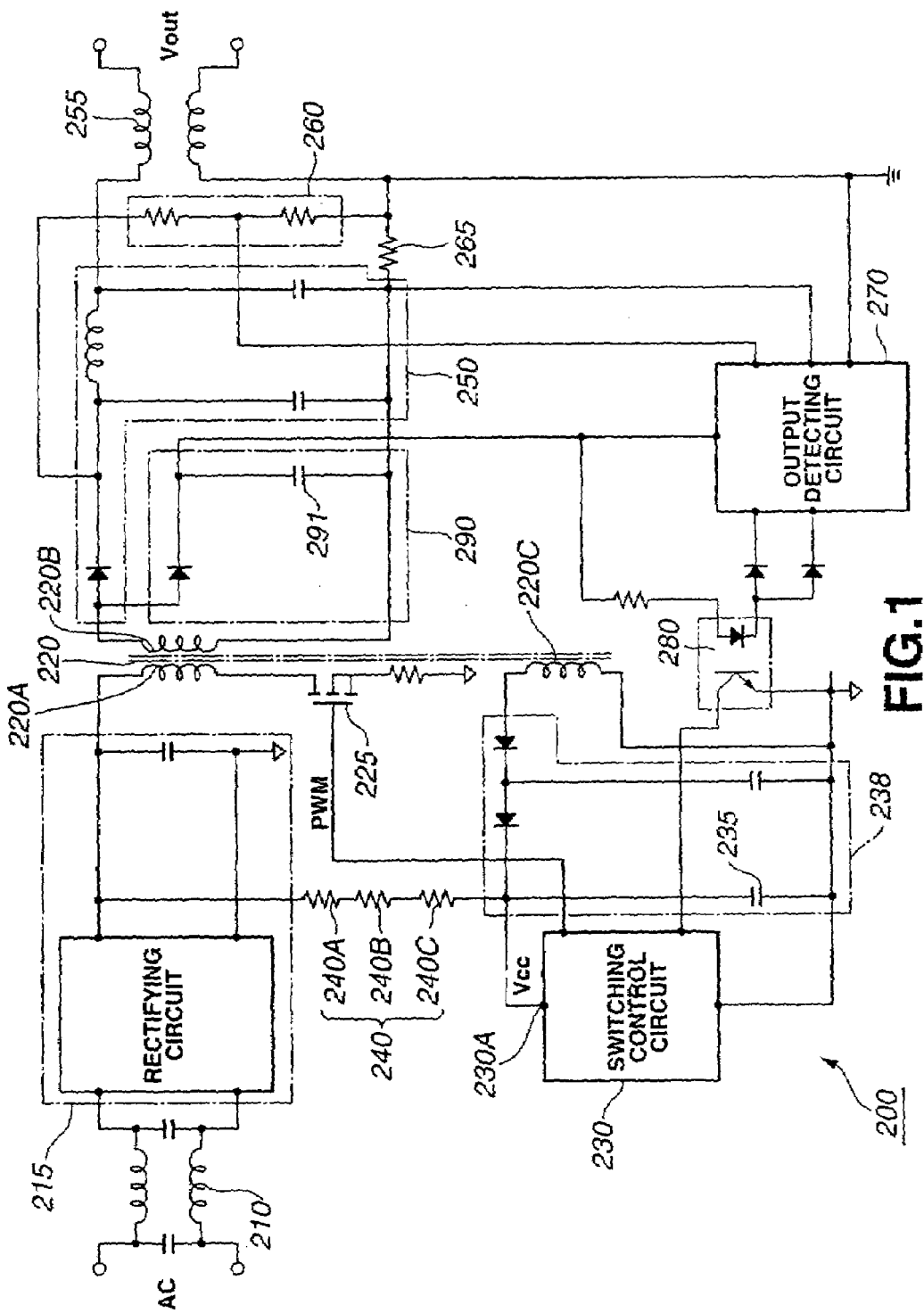
FIG. 1 is a block diagram showing a conventional switching power supply apparatus.
Figure 2:
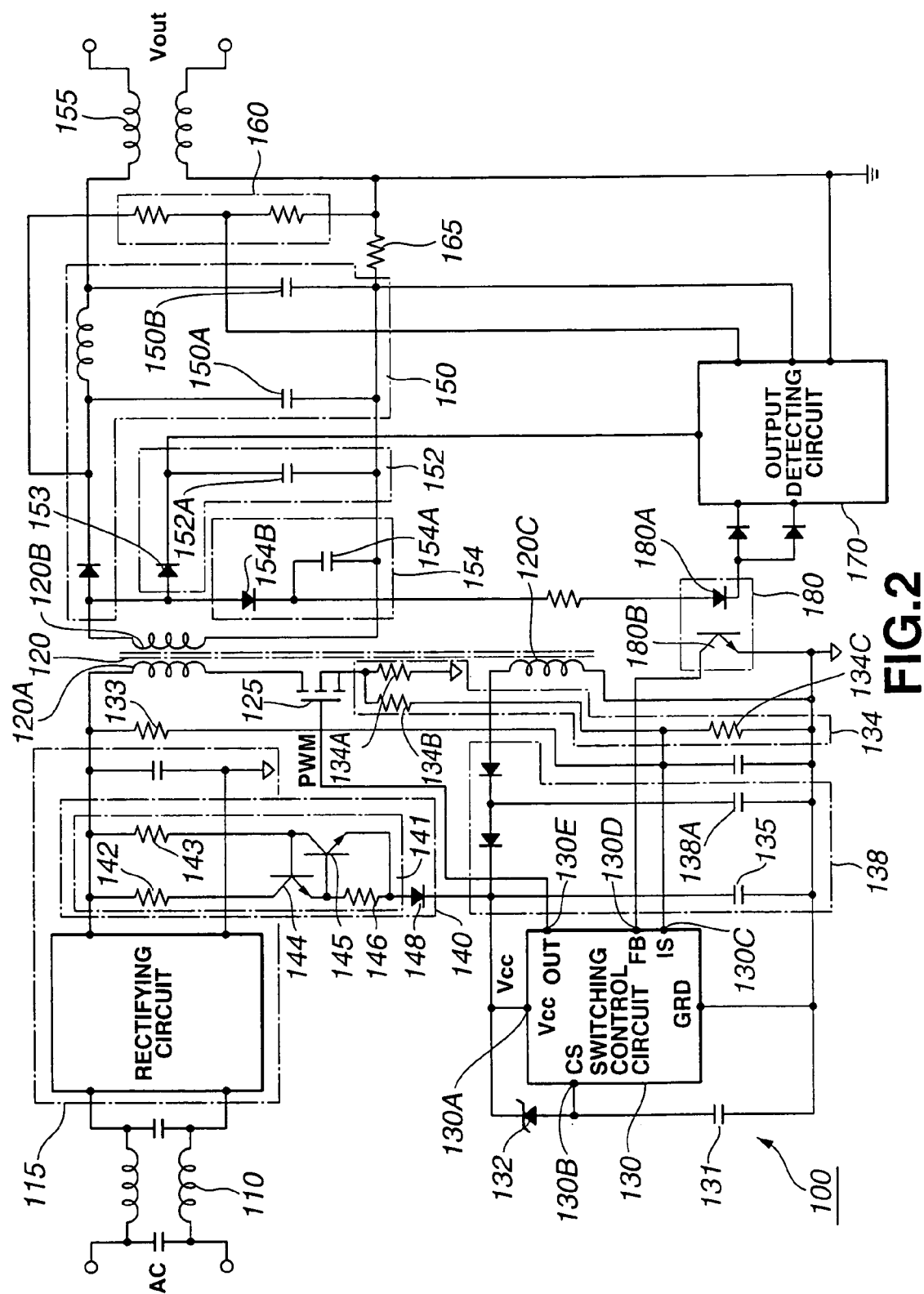
FIG. 2 is a block diagram showing a switching power supply apparatus according to the present invention.

The present invention is applied to, e.g., a switching power supply apparatus 100 of the configuration as shown in FIG. 2.

This switching power supply apparatus 100 comprises a primary side rectifying/smoothing circuit 115 for rectifying and smoothing AC (Alternating Current) input delivered through an AC filter 110 from a commercial power supply AC, wherein drain of a switching FET 125 is connected to this primary side rectifying/smoothing circuit 115 through a primary winding 120A of a converter transformer 120.

Moreover, the switching power supply apparatus 100 comprises a switching control circuit 130 which carries out PWM control of switching operation of the switching FET 125, wherein junction of the AC filter 110 and the primary side rectifying/smoothing circuit 115 is connected to a power supply terminal 130A of the switching control circuit 130 through a starting circuit 140.

A rectified and smoothed output by a rectifying/smoothing circuit 138 connected to a tertiary winding 120C of the converter transformer 120 is delivered, as drive power supply, to the power supply terminal 130A of the switching control circuit 130. The power supply terminal 130A is grounded through a capacitor 135.

This switching control circuit 130 includes a hysteresis low voltage malfunction preventing circuit therewithin for the purpose of preventing malfunction at the time of lowering of power supply voltage, and is operative so that when power supply voltage Vcc given to the power supply terminal 130A rises from 0V, the operation starts at Vcc=16.5 V, and control output is cut off at Vcc=9.0 V at the time of lowering of power supply voltage.

Further, the switching control circuit 130 has soft start function, wherein a CS terminal 130B for soft start control is grounded through a capacitor 131 which gives time constant for soft start, and is connected to the power supply terminal 130A through a Zener diode 132 for overvoltage protection.

The switching control circuit 130 has overcurrent limiting function, wherein an IS terminal 130C for overcurrent detection is connected to junction of the primary side rectifying/smoothing circuit 115 and the primary winding 120A of the converter transformer 120, and is connected to a constant power protecting circuit 134 composed of three resistors 134A, 134B and 134C connected to source of the switching FET 125.

Here, the starting circuit 140 comprises a constant current circuit 141 connected to junction of the AC filter 110 and the primary side rectifying/smoothing circuit 115, wherein this constant current circuit 141 is connected to the power supply terminal 130A of the switching control circuit 130 through a reverse-current prevention diode 148.

The constant current circuit 141 comprises first and second NPN transistors 144, 145 having respective collectors connected to the junction of the AC filter 110 and the primary side rectifying/smoothing circuit 115 respectively through resistors 142, 143, wherein base of the first NPN transistor 144 and collector of the second NPN transistor 145 are connected, emitter of the first NPN transistor 144 is connected to base of the second NPN transistor 145, and junction of emitter of the first NPN transistor 144 and the second NPN transistor 145 is connected to emitter of the second NPN transistor 145 through a resistor 146 for current detection and is connected to cathode of the reverse-current prevention diode 148.

The constant current circuit 141 detects voltage across both terminals of the current detection resistor 146 by the second NPN transistor 145 to control current flowing from the resistor 143 at base of the first NPN transistor 144 to thereby allow a constant current Ic to flow in the current detection resistor 146.

A secondary side rectifying/smoothing circuit 150, a rectifying/smoothing circuit 152 which delivers drive power to an output detecting circuit 170, and a rectifying/smoothing circuit 154 which delivers drive power to a photo-coupler 180 are connected to a secondary winding 120B of the converter transformer 120. The output terminal of the secondary side rectifying/smoothing circuit 150 is connected to the connection terminal of the rectifying/smoothing circuit 152 through a diode 153.

Converter output obtained at the secondary winding 120B of the converter transformer 120 is rectified and smoothed by the secondary side rectifying/smoothing circuit 150, and is outputted through an output filter 155. The output detecting circuit 170 is connected to the secondary side rectifying/smoothing circuit 150 through a resistor dividing circuit 160 for detecting output voltage and a resistor 165 for detecting output current, and detection output by this output detecting circuit 170 is fed back to the switching control circuit 130 through the photo-coupler 180.

In the switching power supply apparatus 100 of such configuration, the switching control circuit 130 is started when a starting current is delivered thereto through the constant current starting circuit 140 at the time of stating to start supply of switching pulses to the switching FET 125. After starting, the switching control circuit 130 is operative with rectified and smoothed output by the rectifying/smoothing circuit 138 connected to the tertiary winding 120C of the converter transformer 120 being as drive power. Detection output by the output detecting circuit 170 is fed back through the photo-coupler 180 to thereby carry out PWM control of switching operation of the switching FET 125 to stabilize converter output.

The switching power supply apparatus 100 according to the present invention operates as follows at the time of starting.

Namely, when AC input is delivered from commercial power supply, the switching power supply apparatus 100 according to the present invention allows constant current (Ic=0.6 mA) to flow in the capacitor 135 through the resistor 142 of the starting circuit 140, the first NPN transistor 144, the current detection resistor 146, and the reverse-current prevention diode 148 to start charging operation.

Voltage Vcc applied to the power supply terminal 130A of the switching control circuit 130 gradually rises according as charging operation of the capacitor 135 advances. When that voltage is above the minimum starting voltage (16.5V) of the low voltage malfunction preventing circuit, the switching control circuit 130 starts the operation to output switching pulses to the switching FET 125. At this time, current consumption of the switching control circuit 130 is increased, and voltage across terminals of the capacitor 135 is lowered. However, since this low voltage malfunction preventing circuit is low voltage malfunction preventing circuit having hysteresis, the switching operation is continued up to the operation minimum voltage (V1=9V).

Here, the capacitor 135 is charged by current value Ic of the constant current circuit 141, whereby voltage Vcc applied to the power supply terminal 130A of the switching control circuit 130 rises. In this case, rising time up to the minimum starting voltage is caused to be, e.g., within 5 sec. Further, product of transient response time, drive current and minimum drive voltage is caused to be smaller than one half of product of square difference of hysteresis voltage of the low voltage malfunction preventing circuit and capacity of the capacitor 135. Thus, this switching power supply apparatus 100 can securely start.

During that time period, current is caused to undergo switching, whereby high frequency current is caused to flow in the secondary and tertiary windings 120B, 120C through the converter transformer 120. This high frequency current is rectified by the secondary rectifying/smoothing circuit 150, and is outputted from the output terminal as converter output through the output filter 155.

This voltage is compared with reference voltage at the output detecting circuit 170 through the resistor dividing circuit 160. In the case where output voltage is high, a light emitting diode 180A of the photo-coupler 180 is caused to be turned ON. In the case where output voltage is low, that light emitting diode 180A is caused to be turned OFF. Thus, that signal is transmitted to the switching control circuit 130 of the primary side to change duty ratio of switching pulses given to the gate of the switching FET 125 to control output voltage Vout so that it becomes equal to constant voltage.

On the other hand, output from the tertiary winding 120C is rectified and smoothed by the rectifying/smoothing circuit 138 at the primary side, and is charged at the capacitor 135. That output is delivered as drive power of the switching control circuit 130. Since that voltage Vcc (voltage value at the ordinary operation is 12V) is higher than voltage from the starting circuit 140 (voltage at the time of starting stabilization is 11V), power supply from the starting circuit 140 connected through the reverse-current prevention diode 148 is stopped. There is no possibility that rectified and smoothed output by the rectifying/smoothing circuit 138 may flow backward toward the starting circuit 140.

Moreover, this switching power supply apparatus 100 operates as follows at the time of ordinary load.

Namely, in this switching power supply apparatus 100, after starting, an error signal obtained by comparing output voltage and reference voltage by the output detecting circuit 170 of the secondary side is fed back to a FB terminal 130D for feedback input of the switching control circuit 130 of the primary side through the photo-coupler 180 to start switching control of the switching FET 125 by the switching control circuit 130. A drive power is delivered from the rectifying/smoothing circuit 138 connected to a tertiary winding 120D of the converter transformer 120 to the power supply terminal 130A of the switching control circuit 130. Further, the switching control circuit 130 carries out PWM control of switching operation of the switching FET 125 so that output voltage Vout becomes constant with respect to no load operation or input voltage change. When load current is taken out from output by a certain value or more, voltage across both terminals of the current detection resistor 165 becomes equal to a certain reference voltage or more, and is detected by the output detecting circuit 170 which compares voltage across both terminals of the current detection resistor 165 with reference voltage. The switching control circuit 130 lowers output voltage Vout in accordance with detection output by the output detecting circuit 170 of the secondary side to carry out PWM control of switching operation of the switching FET 125 so that load current results in constant current.

At this time, the output voltage Vout is lowered. However, power supply voltage of the output detecting circuit 170 delivered from a rectifying/smoothing circuit 152 different from the secondary rectifying/smoothing circuit 150 is not lowered as compared to the output voltage Vout. Thus, stable control can be made.

The switching power supply apparatus 100 according to the present invention operates as follows at the time of no load.

In the switching power supply apparatus 100 according to the present invention, after starting, an error signal obtained by comparing output voltage and reference voltage by the output detecting circuit 170 of the secondary side is fed back to the FB terminal 130D for feedback input of the switching control circuit 130 of the primary side through the photo-coupler 180 to start switching control of the switching FET 125 by the switching control circuit 130. However, output voltage Vout produced at the secondary side becomes higher than reference voltage compared at the output detecting circuit 170 owing to delay of transient response or no load state. As a result, output to the light emitting diode 180A of the photo-coupler 180 is turned ON to operate the switching control circuit 130 so as to stop switching operation of the switching FET 125. When the switching operation of the switching FET 125 is stopped, supply of drive power from the rectifying/smoothing circuit 138 connected to the tertiary winding 120C of the converter transformer 120 to the switching control circuit 130 is carried out only for limited power supply time period. Thus, power supply voltage Vcc of the switching control circuit 130 gradually lowers, and lowers down to voltage (9V) at which the low voltage malfunction preventing circuit becomes operative. When the power supply voltage Vcc lowers, the switching control circuit 130 stops its operation so that it is placed in standby state. When the switching control circuit 130 is placed in standby state, current consumption of the switching control circuit 130 becomes small (6 μA) to raise power supply voltage Vcc of the switching control circuit 130 through the starting circuit 140.

Here, the low voltage malfunction preventing circuit (operating voltage 16.5V) included within the switching control circuit 130 has hysteresis characteristic, and it takes much time until voltage to start operation is reached. During that time period, the output detecting circuit 170 of the secondary side continues its operation by energy stored in a capacitor 152A of the rectifying/smoothing circuit 152. However, when voltage gradually lowers so that potential difference between this voltage and output becomes equal to forward voltage Vf or more of a diode 153, the diode 153 becomes conductive to continue supply of energy to the output detecting circuit 170 by using energy stored in capacitors 150A, 150B of the secondary side rectifying/smoothing circuit 150. During that time period, rectified and smoothed output by the secondary side rectifying/smoothing circuit 150, i.e., secondary output voltage Vout also lowers. As a result, voltage delivered from a rectifying/smoothing circuit 154 to the light emitting diode 180A of the photo-coupler 180 becomes equal to a limit value (5V) or less. Thus, current flowing in the light emitting diode 180A is decreased, and a photo-transistor 180B of the photo-coupler 180 is placed in the state of high impedance. By suitably selecting capacities of these capacitors 150A, 150B, 152A and 154A or by connecting in series plural diodes 154B of the rectifying/smoothing circuit 154 to adjust forward voltage value, it is possible to control the intermittent period from the secondary side.

It is to be noted that transistor switch or semiconductor switch may be also used in place of the diode 153 which delivers power from the secondary side rectifying/smoothing circuit 150 to the output detecting circuit 170 at the time of intermittent operation during standby state.

As a method of adjusting intermittent period at the secondary side, there may be employed an approach such that power consumption of light emitting diode is generally large as compared to power consumption of the output detecting circuit 170, particularly IC prepared by CMOS, and rectifying/smoothing circuit 154 which delivers drive current to light emitting diode 180A of photo-coupler 180 and rectifying/smoothing circuit 152 which delivers drive power to output detecting circuit 170 are separated to reduce capacity of capacitor 154A of the rectifying/smoothing circuit 154 to thereby lower supply voltage earlier as compared to the control system before secondary output voltage Vout too lowers to place the photo-coupler 180 in the state of high impedance to thereby shorten intermittent period to reduce output ripple.

On the other hand, when voltage Vcc delivered to the switching control circuit 130 through the starting circuit 140 of the primary side becomes equal to operating voltage (16.0V) or more of the low voltage malfunction preventing circuit, the switching control circuit 130 immediately wakes up to carry out PWM control of switching operation of the switching FET. However, if the operation of the output detecting circuit 170 of the secondary side is caused to be preferential and the light emitting diode 180A of photo-coupler 180 becomes conductive, the switching control circuit 130 instantaneously outputs switching pulses, and is stopped. Thus, power supply voltage Vcc of the switching control circuit 130 gradually lowers down to the minimum operating voltage of the low voltage malfunction preventing circuit. At times subsequent thereto, such operation is repeated to thereby carry out intermittent operation.

Figure 3:
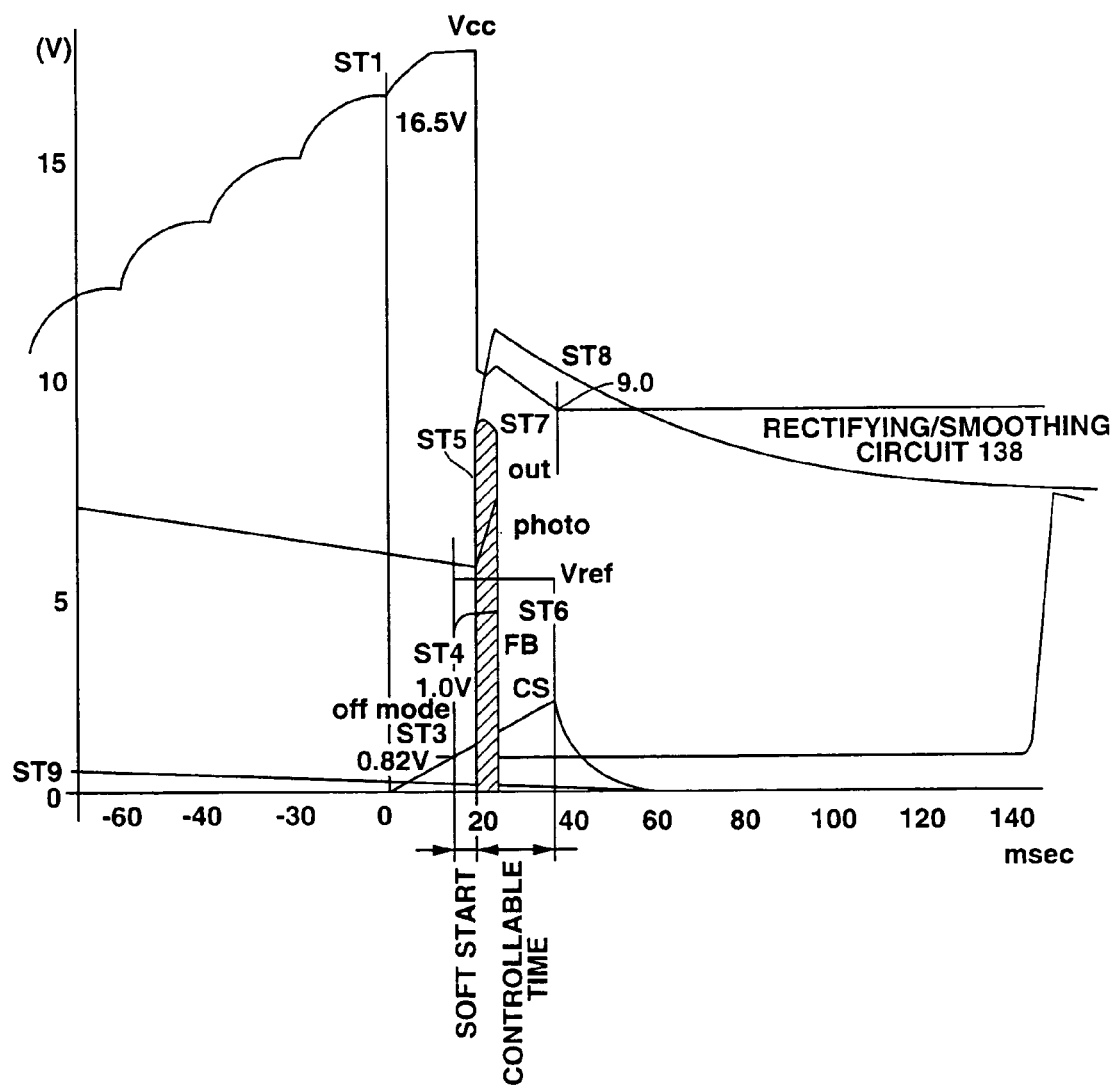
FIG. 3 is a waveform diagram showing the operation of the switching power supply apparatus according to the present invention.

In this switching power supply apparatus 100, the operations of S11–ST10 shown in FIG. 3 are repeatedly carried out to thereby carry out intermittent operation.

Namely, when voltage Vcc applied to power supply terminal 130A of the switching control circuit 130 becomes equal to minimum starting voltage (16.5V) or more of the low voltage malfunction preventing circuit (ST1), capacitor 131 is charged at constant current from CS terminal 130B (ST2). Further, when terminal voltage of the CS terminal 130B becomes equal to 0.82V or more (ST3), 5V of Vref is outputted (ST4). Further, the switching control circuit 130 is caused to undergo soft start from the state where terminal voltage of the CS terminal 130B is 1.0V (until 2V) to output switching pulses from OUT terminal 130E (ST5). When the secondary output is outputted so that its value becomes higher than set voltage, the photo-coupler 180 is turned ON to lower voltage of FB terminal 130D of the switching control circuit 130. Further, since the tertiary output voltage becomes high, the starting circuit 140 is stopped (ST6). When voltage of the FB terminal 130D of the switching control circuit 130 is lowered, the switching control circuit 130 stops that switching pulses are outputted from OUT terminal 130E (ST7). The switching control circuit 130 is adapted so that when voltage Vcc applied to power supply terminal 130A lowers down to 9.0V, Vref is stopped. As a result, the operation is stopped to enter the standby state (ST8). Since the switching control circuit 130 is in standby state, current consumption is decreased to charge capacitor 135 through the starting circuit 140 (ST9). Thus, voltage Vcc of power supply terminal 130A of the switching control circuit 130 is raised (ST10). Even if load becomes heavy during that period, such phenomenon is disregarded.

Here, if charging time to capacitor 138A of the rectifying/smoothing circuit 138 which delivers drive power to the switching control circuit 130 up to low voltage malfunction release voltage of the switching control circuit 130 of the primary side is longer than the time during which the light emitting diode 180A of the photo-coupler 180 is continued to be conductive by the output detecting circuit 170 of the secondary side, it is possible to control intermittent period by the switching control circuit 130. Thus, capacity of the capacitor 138A of the rectifying/smoothing circuit 138 and charge current from the starting circuit 140 are adjusted, thereby making it possible to control intermittent period from the primary side.

Figure 4A:
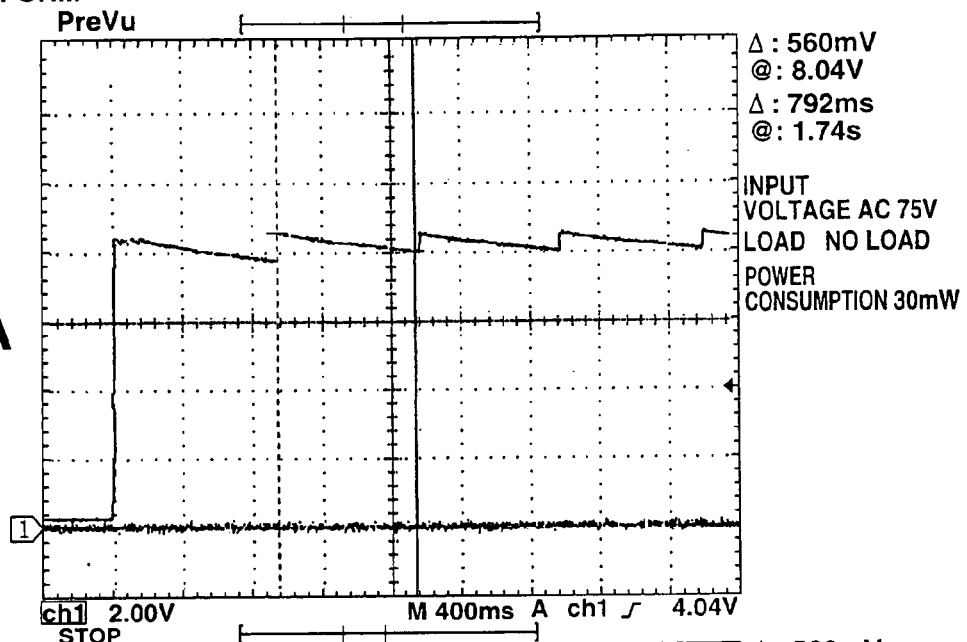
FIGS. 4A and 4B are waveform diagrams showing intermittent operating waveforms of the switching power supply apparatus.
Figure 4B:
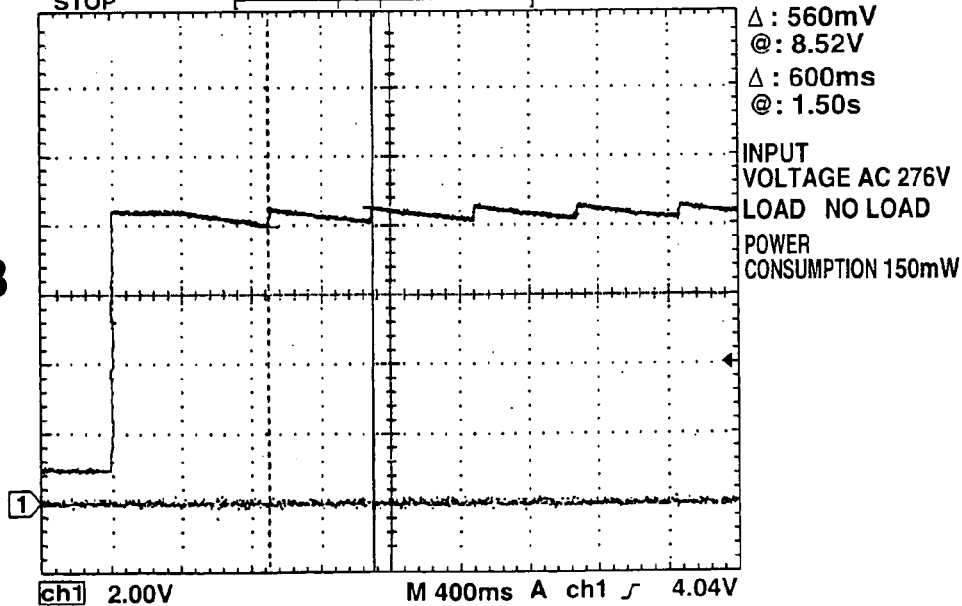

When switching operation is carried out, output is provided with respect to the secondary winding 120B and the tertiary winding 120C of the converter transformer 120 to repeat the above-mentioned operation. As shown in FIGS. 4A and 4B, output voltage Vout becomes sawtooth-shaped voltage between voltage drop by self-discharge (actually measured value 7.7V) and voltage value by intermittent switching operation (actually measured value 8.7V). By carrying out such intermittent operation, its power is decreased by power consumption corresponding to intermittent operation as compared to power consumption when continuous switching operation is carried out (500 mW at input voltage AC 240V). Thus, there results power saving (100 mW at input voltage AC 240V) operation at the time of no load (at the time of standby).

The switching power supply apparatus 100 according to the present invention shifts from no load operation to the ordinary operation in a manner as stated below.

In the switching power supply apparatus 100 according to the present invention, at the time of ordinary operation, load current of output is increased, and ON time of the light emitting diode 180A of the photo-coupler 180 by rising in output voltage is shortened. Thus, the light emitting diode 180A is turned OFF in a short time. Power supply voltage Vcc of the switching control circuit 130 of the primary side during which the light emitting diode 180A is in OFF state is voltage more than low current malfunction protective voltage value. When the light emitting diode 180A is turned OFF, photo-transistor 180B of the photo-coupler 180 is turned OFF to otput switching pulses from the switching control circuit 130 of the primary side to carry out PWM control of switching operation of the switching FET 125 so that there results ordinary continuous operation of constant voltage output. In a manner as stated above, it is possible to adjust shift current to continuous operation by storage power of the secondary side.

For the above-mentioned adjustment, time T1 from the low voltage protective voltage of the primary side up to the release voltage (value determined by operating current value of the switching control circuit 130, capacity values of capacitors 138A, 138B of the rectifying/smoothing circuit 138 which delivers drive power to the switching control circuit 130 and power consumption of the output detecting circuit 170), drivable time T2 from the rectifying/smoothing circuit 154 which delivers drive power to the light emitting diode 180A of the photo-coupler 180, and secondary control drivable time T3 (value determined by capacity values of capacitors 150A, 150B of the secondary rectifying/smoothing circuit 150 and power consumption of the output detecting circuit 170) are required to satisfy the following relationship.

T1>T2>T3

It is to be noted that while the present invention is applied to the switching power supply apparatus employing the PWM control system, the present invention can be also applied to a switching power supply apparatus employing the frequency control system.

INDUSTRIAL APPLICABILITY

As described above, in accordance with the present invention, there is employed such an approach to only adjust values of respective key devices without giving great change to the existing circuit to intermittently carry out switching operation at the time of standby state to suppress power consumption as minimum as possible to realize energy-saving at the time of standby state, and to have ability to carry out ordinary operation such as constant voltage, constant current and various protective functional operations, etc. in the state where circuit for carrying out its intermittent operation is not affected.

Further, the intermittent period can be controlled by capacity of capacitor. Thus, the circuit becomes simple, and intermittent period adjustment can be stably and easily carried out.

In addition, output ripple voltage adjustment by intermittent operation can be easily carried out.

What is claimed is:

1. A switching power supply apparatus, comprising:
   a primary side via which alternating current power is received and a secondary side with an output via which switched power is output;
   a primary side rectifying circuit operatively configured to rectify alternating current power received via said primary side and to generate rectified current power;
   a starting circuit operatively provided at the primary side and operatively coupled to receive said rectified current power generated by said primary side rectifying circuit;
   a switching element;
   a switching control circuit operatively coupled to the starting circuit and having an output coupled to the switching element;
   a hysteresis low voltage malfunction preventing circuit operatively configured and coupled to prevent low voltage malfunction of said switching control circuit;
   a converter transformer with primary, secondary and tertiary windings, with said primary winding having one end coupled to said primary rectifying circuit and another end couple to said switching element;
   a first rectifying/smoothing circuit operatively configured to rectify and smooth current output from said tertiary winding and to supply its output to said switching control circuit;

a photo-coupler having an output coupled to a feedback input of said switching control circuit;

a second rectifying/smoothing circuit coupled between said secondary winding and a power input of said photo-coupler;

an output detecting circuit coupled between said secondary side and said photo-coupler and having an input coupled to detect power at said secondary side output; and a secondary side rectifying/smoothing circuit coupled between said secondary winding and said secondary side output, said output detecting circuit having a power input operatively coupled to said secondary side rectifying/smoothing circuit to receive power therefrom, wherein, drive power is delivered to the photo-coupler by said second rectifying/smoothing circuit for driving the photo-coupler, and drive power is delivered to the output detecting circuit by said secondary side rectifying/smoothing circuit for driving the output detecting circuit.

2. The switching power supply apparatus as set forth in claim 1, wherein time T1 from low voltage protective voltage at which low voltage protection of the low voltage malfunction preventing circuit of the switching control circuit is operative up to release voltage at which protective operation is released, drivable time T2 of a light emitting diode of the photo-coupler, and secondary control operable time T3 of the output detecting circuit driven by the secondary side rectifying/smoothing circuit for driving the output detecting circuit are set as follows:

T1>T2>T3.

3. The switching power supply apparatus as set forth in claim 1, wherein there is provided an additional circuit which delivers power from the secondary side rectifying/smoothing circuit to the output detecting circuit at the time of intermittent operation during a standby state.

4. The switching power supply apparatus as set forth in claim 3, wherein a diode is used as the additional circuit.

5. The switching power supply as set forth in claim 3, wherein a transistor switch is used as the additional circuit.

6. The switching power supply apparatus as set forth in claim 3, wherein the additional circuit comprises a third rectifying/smoothing circuit.

7. The switching power supply apparatus of claim 1, wherein the starter circuit includes a constant current circuit coupled to the power input of the switching control circuit.

8. The switching power supply apparatus of claim 1, wherein the switching control circuit includes an overcurrent limiting capability and the switching power supply apparatus includes a constant power protection circuit coupled to said switching element and an overcurrent input of said switching circuit.

9. The switching power supply apparatus of claim 1, wherein the output detecting circuit is coupled to the secondary side output via a voltage divider circuit.

* * * * *